United States Patent [19]

Mas

[11] 4,039,421

[45] Aug. 2, 1977

[54] APPARATUS FOR THE ELECTROLYSIS OF WATER WHICH OPERATES UNDER PRESSURE

[75] Inventor: Louis Mas, Buc, France

[73] Assignee: Societe de Recherches Techniques et Industrielles, Buc, France

[21] Appl. No.: 652,859

[22] Filed: Jan. 27, 1976

[30] Foreign Application Priority Data

Jan. 31, 1975 France ................................ 75.03105

[51] Int. Cl.² .......................... C25B 1/02; C25B 9/00
[52] U.S. Cl. ................................. 204/266; 204/129; 204/270; 204/278
[58] Field of Search .............. 204/128, 129, 256, 258, 204/266, 270, 275, 278

[56] References Cited

U.S. PATENT DOCUMENTS

| | | | |
|---|---|---|---|
| 2,717,872 | 9/1955 | Zdansky | 204/256 |
| 3,616,436 | 10/1971 | Haas | 204/129 X |
| 3,725,236 | 4/1973 | Johnson, Jr. | 204/129 X |

*Primary Examiner*—Arthur C. Prescott
*Attorney, Agent, or Firm*—Cushman, Darby & Cushman

[57] ABSTRACT

The invention relates to an apparatus for the electrolysis of water which operates under pressure and can be started up without injecting nitrogen. A set of valves arranged in the electrolyte circulation circuit upstream and downstream of the stack of electrolytic cells isolates the stack from the remainder of the apparatus when the apparatus has finished operations, with the result that a specific pressure is maintained within the cells until the apparatus is next started up.

2 Claims, 1 Drawing Figure

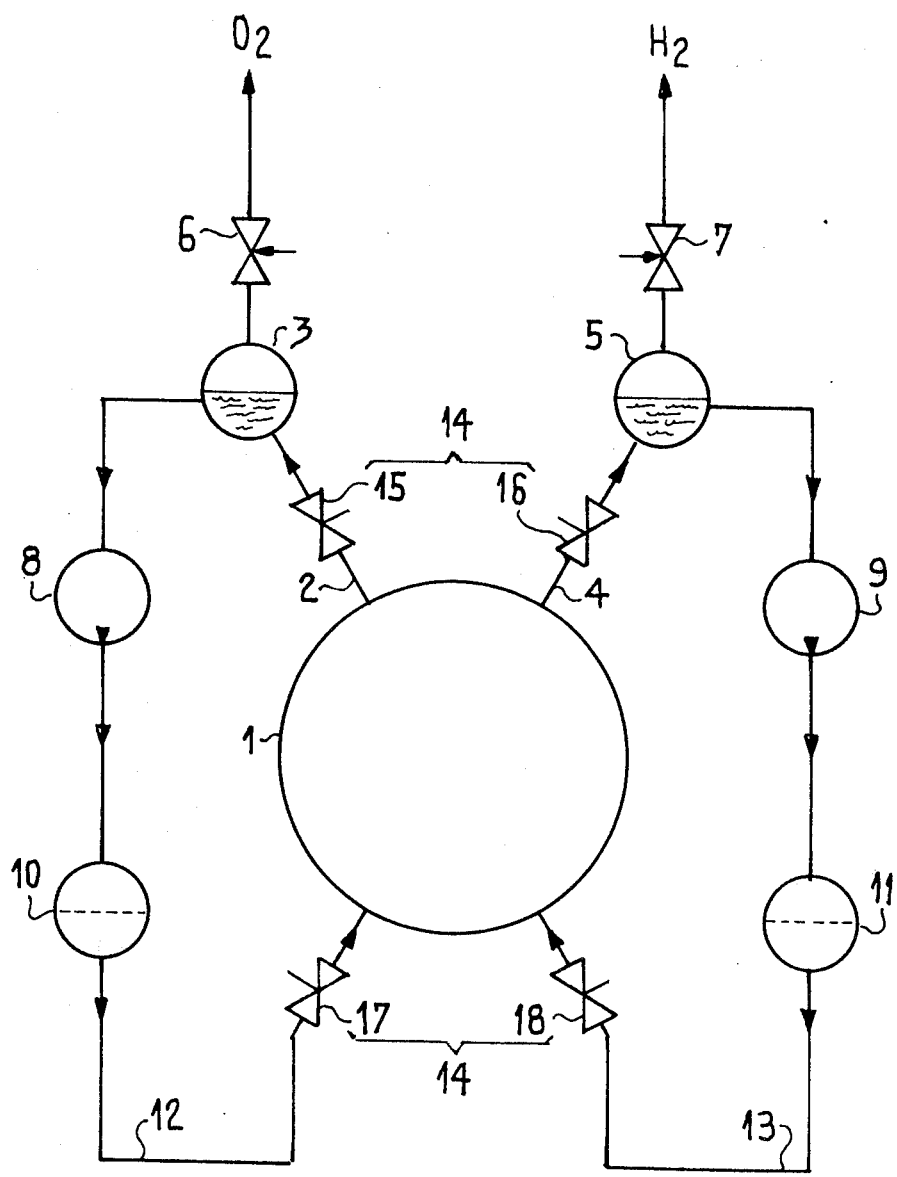

APPARATUS FOR THE ELECTROLYSIS OF WATER WHICH OPERATES UNDER PRESSURE

The invention relates to an apparatus for the electrolysis of water which operates under pressure, and more particularly to an apparatus of this type which can be started up without using nitrogen.

To overcome a certain number of difficulties which are encountered with water-electrolysis apparatus when it is being started up, it is known to pressurise the apparatus with an inert gas, preferably nitrogen, before the current is switched on. Under these conditions, the first bubbles of gas which evolve occupy a smaller volume than they would occupy at atmospheric pressure.

However, under these circumstances there is, on the one hand, a danger that the gases which are generated when the apparatus starts to operate contain nitrogen, and, on the other hand, the amounts of nitrogen used are relatively large since, apart from the amount of gas required to pressurise the apparatus at the beginning, it is also necessary to carry out a scavenging operation with nitrogen before the apparatus is completely shut down. The consumption of nitrogen at the beginning and end of each operating cycle becomes prohibitive in cases where the electrolysis apparatus is not in continuous operation and often has to be started up again, as is the case, for example, with apparatus which is intended to produce hydrogen during off-peak periods of electricity consumption, which apparatus is not in operation for the rest of the time.

An object of the present invention is to overcome these disadvantages and relates to a water-electrolysis apparatus which has the advantages of electrolysis apparatus which is started up with pressurised nitrogen, but which does not share its disadvantages. An electrolysis apparatus according to the invention is capable of starting to operate at a predetermined pressure without nitrogen or an inert gas being injected from the outside. It is of the type which consists of a stack of electrolytic cells, an oxygen separator, a hydrogen separator, means for regulating the pressures of oxygen and hydrogen, and means for circulating the electrolyte. The apparatus is chiefly characterised by the fact that it includes an isolating system which co-opertes with the aforementioned means to isolate the stack of electrolytic cells from the remainder of the apparatus, so that when the apparatus has been shut down and until it is next started up, on the one hand a specific pressure Po is maintained within the stack and on the other hand no migration of electrolyte can take place between the stack and either of the gas separators through the diaphragms of the cells.

The invention more particularly relates to an apparatus for the electrolysis of water which operates under pressure of the type comprising a stack of cells having a return circuit; a first output circuit connected to an oxygen separator and a second output circuit connected to a hydrogen separator; first and second means for regulating the pressure respectively connected to said oxygen separator and to said hydrogen separator; first and second means for circulating the electrolyte, respectively connected between said return circuit and said oxygen separator and between said input circuit and said hydrogen separator, said apparatus further comprising a system which co-operates with said circulating and regulating means to isolate the electrolyte filled stack of cells from the rest of the apparatus, to maintain a predetermined pressure Po within the stack and to prevent any migration of electrolyte once the apparatus has been shut down; said system comprising a set of valves with a first valve positioned in said first output circuit between said stack and said oxygen separator; a second valve positioned in said second output circuit between said stack and said hydrogen separator; at least a third valve positioned in said return circuit between said stack and said first and second means for circulating the electrolyte.

The invention will be better understood from the following explanation and from the single accompanying FIGURE which is a schematic view of an apparatus according to the invention.

Such as apparatus, in common with the majority of known types of apparatus for the electrolysis of water, contains a certain number of components which are found in all such apparatus. These are chiefly a stack 1 of individual electrolytic cells, which is connected by means of a first output circuit 2 to an oxygen separator 3 and by means of a second output circuit 4 to a hydrogen separator 5 : the pressures in which are controlled by regulating means 6 and 7 which are respectively connected to oxygen separator 3 and to hydrogen separator 5. The apparatus further comprises first and second means for circulating the electrolyte respectively connected between a return circuit and the oxygen separator and between the return circuit and the hydrogen separator. These means for circulating are, for example, pumps 8 and 9, which force the electrolyte to through filters 10 and 11 and return circuit. This return circuit comprises one or two lines connected to said means for circulating. In the figure two lines 12 and 13 are shown, but in a modified embodiment (not shown in the FIGURE) the return circuit may consist of only a single line.

In accordance with the invention an isolating system 14, is inserted into the electrolyte circulating circuit, which system is able to isolate the stack 1 of electrolytic cells from the remainder of the apparatus. Such a system 14 may be formed, as shown in the figure, by a set of valves, 15, 16, 17 and 18 which are positioned upstream and downstream of the stack respectively in the output circuits 2 and 4 between stack 1 and gas separators 3 and 5, and in return circuit either in the single line of said return circuit, if there is only one, or in both lines 12 and 13 as shown in the figure. These valves are ones which form a seal in both directions, such valves being commercially available, and are preferably electromagnetic. Their chief function is to isolate the stack 1 of electrolytic cells from the remainder of the apparatus so that, on the one hand, a pressure Po which is predetermined as a function of parameters which will be defined below is maintained within the electrolyte filled stack after the apparatus has ceased to operate and until it is next started up, and on the other hand, no migration of electrolyte is able to take place through the diaphragms from one gas separator to the other. If such migration occurred there would be a danger of hydrogen being conveyed in the dissolved state into the oxygen and vice versa.

A method of using the apparatus according to the invention is as follows. After having shut off the electrolysis current, the oxygen and hydrogen pressure is brought back to vaue Po using the regulating means 6 and 7. The circulation of electrolyte is continued for a short time (approximately a minute) so that the interior of the electrolytic apparatus is throughly cleared of gas, and the isolating system 14 according to the invention is then actuated by closing valves 15, 16, 17 and 18, the effect of which is to isolate stack 1 from the remainder of the apparatus. Regulating means 6 and 7 are closed in their turn, thus maintaining a pressure Po in gas separators 3 and 5. This pressure is maintained within the electrolyte-filled cells throughout the period when the electrolysis apparatus is not operating. When the apparatus is started up, the pressure is already present and it is not necessary to inject an inert gas such as nitrogen. This being the case, starting up may take place without difficulty.

Pressure level Po is selected to be higher than atmospheric pressure in order to allow starting up to be easier and quicker and preferably a good deal lower than the operating pressure for safety reasons. The amount of gas which remains dissolved in the electrolyte is, in fact, proportional to pressure. A small quantity of this gas may be released when accidental variations in pressure take place whilst the apparatus is shut down as a result of the installation cooling down, for example. The pressure may be selected to be close to operating pressure. In this case, an additional precaution is taken which consists in maintaining the flow of electrolyte for a period sufficient to ensure that any bubbles which there might be in the structure and circuits are carried off to gas separators 3 and 5. A value close to five bars is selected for Po when the normal operating pressure is approximately 50 bars i.e. Po is about one-tenth of the rated pressure : in these conditions a optimum compromise is obtained between safety and ease of starting. Experience shows that, with an electrolysis apparatus according to the invention which operates at a pressure of 40 bars and a temperature of 80° to 90° C, if the purity of the hydrogen is 99.85 percent at the time of shut-down, after 48 hours shut-down, when the temperature of the apparatus has returned to ambient temperature, the impurity level when the apparatus is restarted and when the operating pressure of 40 bars is reached is less than 2.5 percent, which is well below the threshold of explosibility.

The isolating system as employed in an electrolysis apparatus according to the invention considerably improves the operation of the apparatus. It is not a safety device which triggers automatically in case of incident, such as is found in a number of such installation, these devices being normally formed by back-pressure valves which close automatically as soon as the pressure in the circuit for returning the electrolyte from the gas separators to the stack falls below a certain level. The isolating system according to the invention is formed from valves which are actuated, when required, as a function of operating requirements. As stated above, it enables the installation to be shut down and started up again without the need to use an inert gas, hence its great utility in installations which need to be able to operate intermittently.

What is claimed is:

1. An apparatus for the electrolysis of water which operates under pressure of the type comprising a stack of cells having a return circuit; a first output circuit connected to an oxygen separator and a second output circuit connected to a hydrogen separator and out of communication with said first output circuit; first and second means for regulating the pressure respectively connected to said oxygen separator and to said hydrogen separator; first and second means for circulating the electrolyte, respectively connected between said return circuit and said oxygen separator and between said input circuit and said hydrogen separator, said apparatus further comprising an isolating system which co-operates with said circulating and regulating means to prevent any migration of electrolyte once the apparatus has been shut down, said system comprising a set of valves with a first valve positioned in said first output circuit between said stack and said oxygen separator, a second valve positioned in said second output circuit between said stack and said hydrogen separator, at least a third valve positioned in said return circuit between said stack and said first and second means, for isulating the electrolyte, said system maintaining a pressure Po predetermined to enable said apparatus to start up again without the help of inert gas, said pressure Po being comprised between the atmospheric pressure and the rated operating pressure of said apparatus.

2. an apparatus as claimed in claim 1, wherein said return circut comprises a first line connecting said first means for circulating to said stack, a second line connecting said second means for circulating to said stack and wherein said set of valves comprises said first and second valves and two valves, one of them positioned in said first line and the other positioned in said second line, said valves being electromagnetic valves capable to form a seal in both direction.

* * * * *